Nov. 10, 1925.

E. EGER 1,560,551

CUSHION TIRE

Filed Jan. 12, 1924

INVENTOR
ERNST EGER
BY
HIS ATTORNEY

Patented Nov. 10, 1925.

1,560,551

UNITED STATES PATENT OFFICE.

ERNST EGER, OF DETROIT, MICHIGAN, ASSIGNOR TO MORGAN & WRIGHT, OF DETROIT, MICHIGAN, A CORPORATION OF MICHIGAN.

CUSHION TIRE.

Application filed January 12, 1924. Serial No. 685,813.

*To all whom it may concern:*

Be it known that I, ERNST EGER, a citizen of the United States, and a resident of Detroit, county of Wayne, and State of Michigan, have invented a certain new and useful Cushion Tire, of which the following is a full, clear, and exact description.

This invention relates to solid tires of the cushion type.

It aims to provide a new and novel construction of solid tire so shaped externally as to dissipate heat in service and afford maximum cushion or yield compatible with requisite load-carrying capacity. Another object is a form of tire which can be vulcanized with satisfactory uniformity and economy.

An embodiment of the invention is illustrated in the accompanying drawings, in which:—

Figure 1:
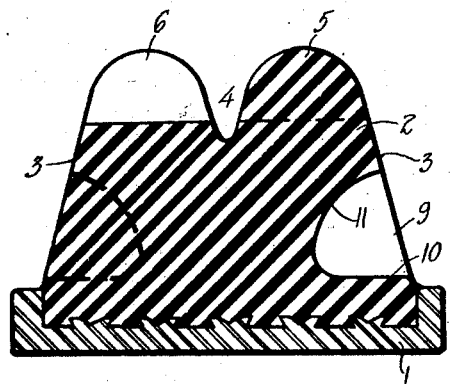
Figure 1 is a cross-section of the tire.
Figure 2:
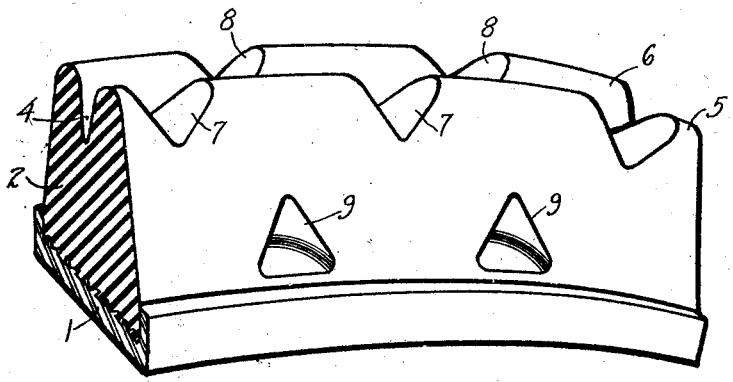
Figure 2 is a perspective of a length of the tire.

Referring to the drawings, the tire is shown comprising a metallic base-band or rim 1, to which is vulcanized a rubber body portion indicated at 2. A relatively thin stratum of rubber of harder composition than the body 2 is usually applied immediately next to the rim 1 as well known to those skilled in the art.

The tire is preferably made with convergent side walls 3. In its outer periphery is provided a channel, 4, dividing it into a pair of tread portions 5 and 6, each of which is notched, as indicated at 7 and 8. The notches 7 in tread portion 5 are staggered with relation to those, 8, in tread portion 6. In the side walls 3 of the tire are provided cavities 9 at a point remote from the tread portions 5 and 6, and located preferably between radii extending from the axes of the tire to adjacent notches 7—8 in each of the tread portions 5 and 6.

The cavities 9 may be of various shapes but are preferably defined by a bottom wall 10, generally paralleling the rim 1, and by side and roof-forming walls which converge both upwardly and inwardly, imparting a somewhat dome-shaped or arcuate form, as indicated at 11, to the inner extremity of each socket. The cavities 9 are approximately triangular in shape when viewed at right angles to the plane of the tire and penetrate inwardly, preferably to a depth under about the center of each of the tread portions 5 and 6.

Figure 3:
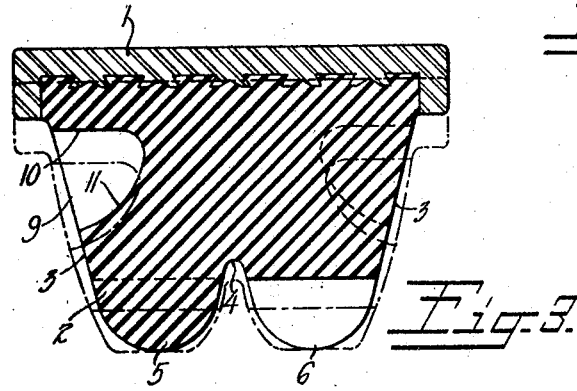
Figure 3 illustrates how the tire deforms in service under load.

In operation, the tire deforms under load, as indicated in dotted lines in Figure 3. The deformation is localized in the soft rubber body portion, at least very largely, and does not materially distort the rubber adjacent the metallic rim 1. This is a desirable feature as distortion of the rubber adjacent the rim tends to separate it from the metal. The shape of the tire is such that the rubber is readily deformed in service, but does not heat up to a destructive or intolerable extent. The tread deformation affords a good traction grip on the roadway and the notches 7 and 8 interrupt the traction wave that forms ahead of the rolling point of contact with the roadway and contributes to the non-heating property of the tire in service. It will be noticed that the cavities 9 have no sharp corners likely to develop cracks or fissures.

It will be understood that changes may be made in the configuration of the tire without departing from the underlying principles of its construction, and reference should therefore be made to the appended claims for an understanding of the scope of the invention.

Having thus described my invention, what I claim and desire to protect by Letters Patent is:—

1. A cushion tire provided in the center of its periphery with an annular channel dividing it into two tread portions, each of said tread portions being notched in staggered relation to the other, the side walls of the tire having cavities remote from the tread portions and between radii extending to adjacent notches in each of the tread portions, said cavities being triangular in side elevation and diminishing in cross-section inwardly of the tire.

2. A cushion tire provided in the center of its periphery with an annular channel dividing it into two tread portions, each of said tread portions being notched in staggered relation to the other, the side walls of the tire having cavities remote from the tread portions and between radii extending to adjacent notches in each of the tread portions, said cavities being defined by a bottom wall approximately parallel to the base of the tire and by convergent side and top-forming walls, the cavities penetrating inwardly to a point under approximately the center of each tread portion.

Signed at Detroit, county of Wayne, and State of Michigan, this 7th day of January, 1924.

ERNST EGER.